Nov. 12, 1935. S. M. ANDERSON Re. 19,748

COOLING SYSTEM

Original Filed Jan. 31, 1934 2 Sheets-Sheet 1

Inventor
Samuel M. Anderson by Robert T. Palmer
Attorney

Nov. 12, 1935. S. M. ANDERSON Re. 19,748

COOLING SYSTEM

Original Filed Jan. 31, 1934 2 Sheets-Sheet 2

Inventor
Samuel M. Anderson by Robert T. Palmer
Attorney

UNITED STATES PATENT OFFICE 19,748

COOLING SYSTEM

Samuel M. Anderson, Sharon, Mass., assignor to B. F. Sturtevant Company, Inc., Boston, Mass.

Original application January 31, 1934, Serial No. 709,118. Divided and this application January 12, 1935, Serial No. 1,524, Patent No. 2,007,291, dated July 9, 1935. This application for reissue August 6, 1935, Serial No. 34,927

2 Claims. (Cl. 62—117)

This invention relates to the conditioning of air for passenger vehicles, and relates more particularly to the conditioning of air circulated through railway cars.

This application is a division of my co-pending application, Serial No. 709,118, filed January 31, 1934.

It is now becoming well known that human comfort requires that the air within an enclosure should be not only circulated to provide sufficient ventilation but should in winter be warmed, with moisture added to maintain the proper relative humidity, and in summer should be cooled, and moisture extracted from it to overcome the excessive humidity which is usually present.

While the conditioning of air for motion picture theaters, hotel, office and industrial buildings has been developed to a high degree in recent years, the air conditioning of vehicles, and particularly railway cars, has been more or less neglected, due, perhaps, to the peculiar problems involved and the many difficulties present. Among the difficulties which present themselves are the lack of space in a railway car, which already of necessity has had to accommodate the maximum of equipment in the minimum of space, the excessive refrigeration equipment which would have to be carried if the ordinary method of conditioning buildings were followed, the changing temperature conditions through which a railway car must pass, the cost of the equipment, and other difficulties.

According to a feature of this invention, an air conditioning system in which the conditioned air is distributed without ducts, is provided. The air conditioning chamber is mounted in the center of the car, or other space being served, and the conditioned air is discharged towards each end of the car from the center. The air is discharged from the chamber in two loop circuits, overhead the passenger space. The air passes down along one side of the car and overhead the passenger space and is returned to the chamber down along the other side of the car and overhead the passenger space from each of the two sides of the chamber, the chamber thus serving to supply air without ducts from a central location to the two halves of the car. Outside and recirculated air is drawn into the chamber, filtered, temperature conditioned, and discharged. In summer, the air is cooled and dehumidified, and, in winter, the air is heated and humidified.

According to another feature of the invention, the compartment is supplied with cold water from the ice cooling system and pre-cooling coils are provided in the path of mixed outside and recirculated air, the warmest ice water being fed through the pre-cooling coils which extract all of the heat possible from the air being conditioned.

An object of the invention is to provide pre-cooling coils in an ice cooling system in the path of the mixed recirculated and outside air to be conditioned.

Other objects of the invention will be apparent from the following description taken with the drawings.

The invention will now be described with reference to the drawings, of which:

Figure 6:
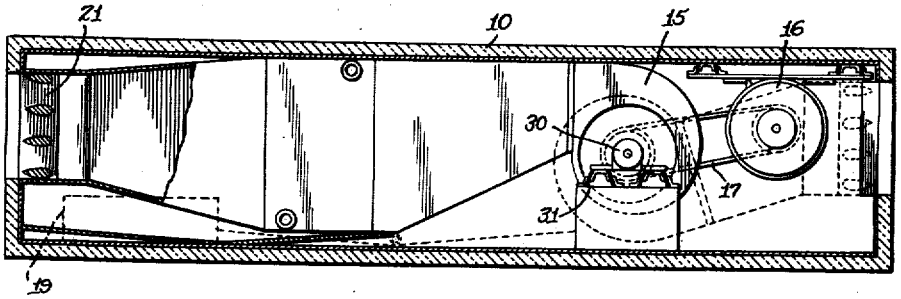
Fig. 6 is a side sectional view of the compartment shown by Fig. 5.

The air conditioning compartment shown by Fig. 6 comprises an insulating casing 10 which extends completely around the sides of the compartment. The compartment contains the extended surface main cooling coils 11, the pre-cooling coils 12, the steam heating coils 13, the steam humidifiers 14, the fans 15, which are driven by motor 16 through the intermediary of the belt 17, the outside air inlets 18, the filters 19 mounted within the inlets 18 on the inside of the compartment, the recirculated air inlets 20, and the discharge outlets 21.

The cooling compartment is thus seen to have two recirculated air inlets and two discharge outlets. The compartment is divided into two units by the partition 22 so that the air drawn in by one of the fans 15 enters through one of the outside air inlets 18, one of the recirculated air inlets 20, passes first over one of the pre-cooling coils 12, then over half of the cooling coils 11, then over the steam coil 13, and out one of the discharge outlets 21. It is seen that two complete units, each serving half of the car with conditioned air, are provided in a single compact and efficient compartment requiring a minimum of apparauts due to the fact that much of the apparatus is common to the two units.

Figure 1:
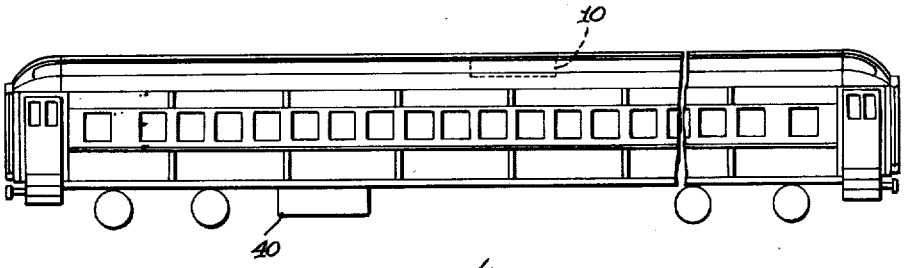
Fig. 1 is a side view of a railway car equipped according to the present invention.
Figure 2:
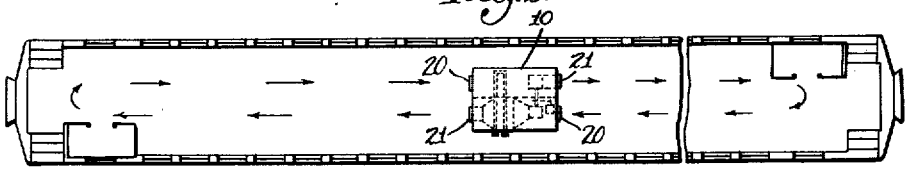
Fig. 2 is a plan view, with top removed, of the car and apparatus of Fig. 1.
Figure 3:
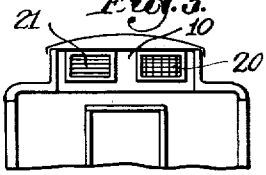
Fig. 3 is a view looking into the car of Figs. 1 and 2 from one end, with end removed.

The air discharged, as shown by Figs. 1 and 2, overhead the passenger space and down along one side of the car, and is returned overhead the passenger space and down along the other side of the car. It has been found that this arrangement is particularly suitable for the supply of cold and dehumidified air in hot weather. In order to dehumidify the air sufficiently, it is usually necessary to cool it to a very low dew point, at which the temperature of the cold air is too low for comfort. But, with the present arrangement, this highly cooled air does not enter directly the area occupied by passengers. Air is circulated completely above the passenger space, and, by the action of gravity, the cold air gradually diffuses down from the level at which it is discharged from the cooling compartment, and, before entering the area occupied by passengers, contacts intimately with the warm air above the passenger space and so has sufficient superheat added to it by the time the conditioned air reaches the passengers it has a temperature which is not too cold for comfort.

Figure 4:
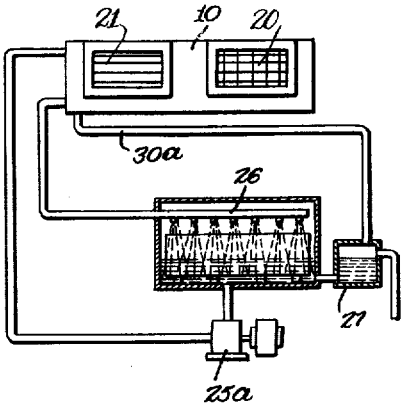
Fig. 4 is a diagrammatic view showing an ice cooling system for cooling the air.
Figure 5:
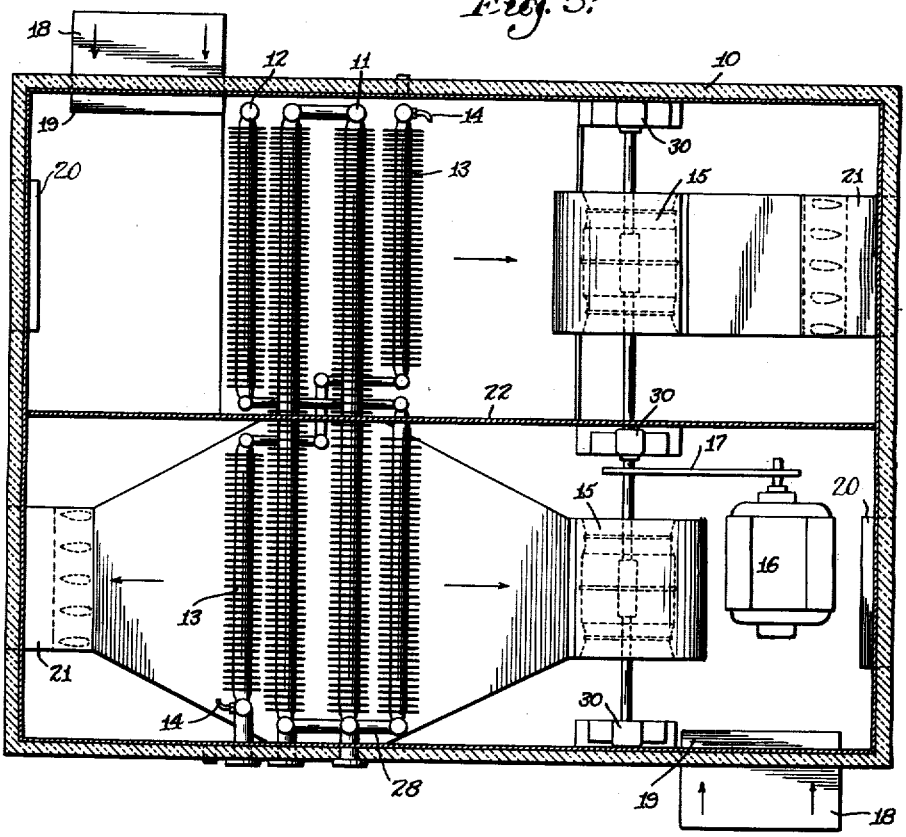
Fig. 5 is a sectional plan view showing the apparatus in an air conditioning chamber of this invention.

An ice cooling system such as that illustrated by Fig. 4 may be used for cooling the car. In this case, ice water is circulated through the cooling coils 11 by the pump 25a, the returned water being sprayed through the spray nozzles 26 on the ice surface so as to remove, by the melting of the ice, the heat units in the water. In order to prevent the excess water caused by the melting of the ice from being discharged to the tracks at too low a temperature, a portion of the relatively warm water leaving the cooling coils 11 is passed at the junction point 28 (Fig. 5) through the two pre-cooling coils 12, one of which is mounted in each of the two air conditioning units included within the cooling compartment 10. The amount of water passing through the pre-cooling coils 12 is preferably equal to that which would ordinarily be excess water, caused by the melting of the ice, and ordinarily drained to the tracks. This water serves to additionally cool the air and then is discharged from the cooling coils 12, through the pipe 30a, to the compartment 27, from which it is drained to the tracks.

It has been the practice in the past to mount pre-cooling coils, such as coils 12, in the outside air inlets. The advantages of mounting coils in the path of the mixed outside and recirculated air are that less power is required to move the air over the coils to obtain the same heat transfer. Usually the larger part of the conditioned air is recirculated air, while a minor portion is outside air. To obtain sufficient heat transfer from a pre-cooler used to cool the small volume of outside air requires more surface in a smaller area with higher resistance than where the pre-cooler is mounted in the path of the mixed air, where, due to the larger volume, less surface is required. Also, from the design engineering standpoint, it is preferable that all of the heat exchange surfaces be arranged within the main cooling compartment where more space is available.

Whereas the invention has been described in connection with the conditioning of air supplied to passengers within a railway car, it should be understood that the invention is also applicable to any other enclosure to which it is desired to supply conditioned air.

Whereas one embodiment of the invention has been described for the purpose of illustration, it should be understood that the invention is not limited to the details described, since many modifications may be made by those skilled in the art without departing from the spirit of the invention.

What is claimed is:

1. Air conditioning apparatus for a passenger vehicle, comprising a conditioning compartment located in the roof zone of the vehicle, means for drawing in fresh and recirculated air and passing it through said compartment, air cooling means in said compartment, an ice chamber for providing cold water through the melting of ice, means for circulating the cold water to said air cooling means and returning a portion of same to said chamber, a pre-cooling coil mounted in said compartment in the path of the air to be cooled, and means for continuously passing the remaining portion of the water leaving said air cooling means through said pre-cooling coil and then discharging it from said vehicle.

2. Air conditioning apparatus for a passenger vehicle, comprising a conditioning compartment located substantially in the center of the vehicle and in the roof zone thereof, completely above the useful passenger space, a cooling coil in said compartment, means for drawing in fresh and recirculated air and passing it over said coil, an ice chamber for cooling water through the melting of ice, means for circulating the cold water through said coil and for returning a portion of same to said chamber, a pre-cooling coil, and means for continuously passing the other portion of the water leaving said cooling coil and then discharging it from said vehicle through said pre-cooling coil.

SAMUEL M. ANDERSON.

DISCLAIMER

Re. No. 19,748.—*Samuel M. Anderson*, Sharon, Mass. COOLING SYSTEM. Patent dated November 12, 1935. Disclaimer filed August 5, 1936, by the assignee, *B. F. Sturtevant Company, Inc.*

Hereby enters this disclaimer to the combination as set forth in claim 1 of said patent, except wherein the precooling coil is mounted in the path of the recirculated and fresh air passing through the conditioning compartment.

[*Official Gazette August 25, 1936*]